(12) United States Patent
Buesseler

(10) Patent No.: US 10,132,935 B2
(45) Date of Patent: Nov. 20, 2018

(54) ENVIRONMENTAL MONITORING ASSEMBLY AND METHOD

(71) Applicant: Woods Hole Oceanographic Institution, Woods Hole, MA (US)

(72) Inventor: Ken O. Buesseler, Falmouth, MA (US)

(73) Assignee: WOODS HOLE OCEANOGRAPHIC INSTITUTION, Woods Hole, MA (US)

(*) Notice: Subject to any disclaimer, the term of this patent is extended or adjusted under 35 U.S.C. 154(b) by 0 days.

(21) Appl. No.: 15/306,100

(22) PCT Filed: Apr. 20, 2015

(86) PCT No.: PCT/US2015/026691
§ 371 (c)(1),
(2) Date: Oct. 23, 2016

(87) PCT Pub. No.: WO2015/164269
PCT Pub. Date: Oct. 29, 2015

(65) Prior Publication Data
US 2017/0045628 A1    Feb. 16, 2017

Related U.S. Application Data

(60) Provisional application No. 61/983,055, filed on Apr. 23, 2014.

(51) Int. Cl.
*G01T 1/04* (2006.01)
*G01T 1/178* (2006.01)

(52) U.S. Cl.
CPC ................... *G01T 1/178* (2013.01)

(58) Field of Classification Search
CPC ... G01T 7/00; G01T 7/04; G01N 1/02; G01N 30/08; G01N 30/12; G01N 30/146; G01N 30/84; G01N 33/0057; G01N 1/2214; G01N 1/2216; G01N 1/128; G01N 1/40; G01N 21/76; G01N 30/14; G01N 30/40
See application file for complete search history.

(56) References Cited

U.S. PATENT DOCUMENTS 3,409,771 A * 11/1968 Reil ........................ G01T 7/04
250/343
3,610,037 A    10/1971 Greene
(Continued)

OTHER PUBLICATIONS

Quek et al., "COIR as a biosorbent of copper and lead," 1998, Trans IChemE, vol. 76, Part B, pp. 50-53.*
(Continued)

*Primary Examiner* — Kiho Kim
(74) *Attorney, Agent, or Firm* — Douglas Denninger

(57) ABSTRACT

A monitoring assembly and method to measure selected properties of water or other amorphous medium, including a carrier suitable for immersion in the medium and a sorbent module, held by the carrier and capable of being exposed to medium of interest, having at least one sorbent material capable of capturing at least a first, target item and a second, reference item from the medium during a sampling period. Preferably, a sensor module measures at least one parameter that is associated with the sampling period for the sorbent module.

20 Claims, 4 Drawing Sheets

(56) References Cited

U.S. PATENT DOCUMENTS

| | | | | |
|---|---|---|---|---|
| 5,092,217 | A | * | 3/1992 | Achter .................. G01N 1/02 |
| | | | | 73/1.04 |
| 7,188,767 | B2 | | 3/2007 | Penuela |
| 9,024,271 | B2 | | 5/2015 | Aslam |
| 9,241,661 | B2 | | 1/2016 | Shnaper |
| 2006/0237648 | A1 | * | 10/2006 | Bushberg ............... G01T 1/02 |
| | | | | 250/336.1 |
| 2013/0320220 | A1 | | 12/2013 | Donowsky |

OTHER PUBLICATIONS

Liu et al., "Adsorption removal of cesium from drinking water: A mini review on use of biosorbents and other adsorbents," 2014 (available online Jan. 11, 2014), vol. 160, pp. 142-149.*

Bourquin et al., "Comparison of techniques for pre-concentrating radium from seawater," 2008, Marine Chemistry, vol. 109, pp. 226-237.*

Malzahn et al., "Wearable electrochemical sensors for in situ analysis in marine environments," 2011, Analyst, vol. 136, pp. 2912-2917.*

Pike, SM et al. (2012) Extraction of cesium in seawater off Japan using AMP-PAN resin and quantification via gamma spectroscopy and inductively coupled mass spectrometry. J Radioanal Nucl Chem. Apr. 2013, vol. 296, Issue 1, pp. 369-374.

Kamenik, J et al. (2012) Cesium-134 and 137 activities in the central North Pacific Ocean after the Fukushima Dai-ichi Nuclear Power Plant accident. Biogeosciences, 10, 6045-6052.

Kamenik, J et al. (2012) Fast concentration of dissolved forms of cesium radioisotopes from large seawater samples. J Radioanal Nucl Chem. vol. 296, Issue 2, pp. 841-846.

Buesseler, KO. (2014) Fukushima and ocean radioactivity. Oceanography 27(1):92-105.

Breier, CF et al. (2015) New applications of KNiFC-PAN resin for broad scale monitoring of radiocesium following the Fukushima Dai-ichi nuclear disaster. J Radioanal Nucl Chem. vol. 307, Issue 3, pp. 2193-2200.

Buesseler, KO et al., Fukushima-derived radionuclides in the ocean and biota off Japan, PNAS, 2012, pp. 1-5, www.pnas.org/cgi/doi/10.1073/pnas.1120794109.

Buesseler, KO et al., Supporting Information, PNAS, 2012, pp. 1-7, 10.1073/pnas.112094109, www.pnas.org/cgi/content/short/1120794109.

O'Connell, SG et al., Silicone Wristbands As Personal Passive Samplers, Environ. Sci. Technol., Feb. 18, 2014, pp. 3327-3335, vol. 48, Am. Chem. Soc.

* cited by examiner

ENVIRONMENTAL MONITORING ASSEMBLY AND METHOD

CROSS-REFERENCE TO RELATED APPLICATION

This application is a national phase filing under 35 USC § 371 of international application No. PCT/US2015/026691 filed 20 Apr. 2015, which claims priority to U.S. Provisional Application No. 61/983,055 filed 23 Apr. 2014. The entire contents of each of the above-mentioned applications are is incorporated herein by reference.

FIELD OF THE INVENTION

The invention relates to portable devices, systems, and methods for sampling a plurality of parameters from an amorphous medium such as water and more particularly to the combination of at least one sorbent module with a sensor module.

BACKGROUND OF THE INVENTION

There is a growing interest to better understand one or more parameters in selected bodies of water such as pools, lakes, rivers, and areas of the ocean. A body of water may contain many naturally-occurring elements including radionuclides, as well as elements generated by humans including the remnants of nuclear disasters and nuclear weapons testing and other contaminants.

The background level of radiation in water varies around the globe. The primary source of cesium-137, for example, has been atmospheric nuclear weapons testing in the 1950s and 1960s, but particular regions have experienced noticeable increases in radionuclides, also referred to as radioisotopes. The Irish Sea shows elevated levels of cesium-137 compared to large ocean basins as a result of radioactive releases from the Sellafield nuclear fuel reprocessing facility at Seacastle, UK. Levels in the Baltic and Black Seas are elevated due to fallout from the 1986 explosion and fire at the Chernobyl nuclear reactor. Fallout, runoff, and continued leaks from the Fukushima Dai-ichi nuclear power plant have added to the background level of radiation in the Pacific Ocean starting in 2011.

Interest has been shown in sampling, especially for water quality at local sites, at websites such as the "How radioactive is our ocean?" in "http://ourradioactiveocean.org" currently operated with the Center for Marine and Environmental Radiation at Woods Hole Oceanographic Institution. An interactive map with selected water-quality results is currently available at the "View Current Results" page at that website. In order to measure radionuclides or other water quality parameters on a larger special scale, a method for achieving faster collection of samples in situ is necessary.

Cesium-selective materials, typically fibers or resins such a resin beads, can be linked with KNiFC (potassium-nickel hexacyanoferrate (II)), or other transition metal ferrocyanide complexes to form materials that are sorbent at neutral pH and are selective for cesium-like elements. One specific example is a resin that incorporates active KNiFC associated with inorganic ion exchangers embedded with modified polyacrylonitrile (PAN) as a binding matrix, as described by Sebesta in "Composite sorbents of inorganic ion-exchangers and polyacrylonitrile binding matrix", J. Radioanalytical and Nuclear Chem., Vol. 220, No. 1, 77-88 (1997). Copper ferrocyanide has also been used for cesium sorption in association with fibers, as discussed by Buesseler et al. in "Determination of Fission-Products and Actinides in the Black Sea Following the Chernobyl Accident", J. Radioanalytical and Nuclear Chem., Vol. 138, No. 3, 33-47 (1990). Sampling and analysis of cesium near Japan is described by Buesseler et al. in "Fukusima-derived radionuclides in the ocean and biota off Japan", PNAS Early Edition, www.pnas.org/cgi/doi/10.1073/pnas.1120794109, 1-5 and "Supporting Information" 1-7 (2012).

Use of sorbents having different properties to determine the concentration of dissolved thorium is discussed by Hartman and Buesseler in "Adsorbers for In-Situ Collection and At-Sea Gamma Analysis of Dissolved Thorium-234 in Seawater", WHOI Technical Report, WHOI-94-15 (1994). Impregnation of polypropylene cartridges with $MnO_2$ is described in the Appendix.

Most sampling and measurement of radionuclides, also referred to as radioisotopes, and other elements requires known volumes of water. Water itself is heavy, and transporting quantities of water to be analyzed is awkward and can be expensive.

It is therefore desirable to have portable, preferably wearable, sampling devices that can be utilized by a wide variety of people to monitor selected parameters in water, in air, or in another amorphous medium.

SUMMARY OF THE INVENTION

An object of the present invention is to provide an improved, light-weight monitoring assembly and technique that measures multiple parameters in an amorphous medium at a selected site.

Another object of the present invention is to facilitate low-cost water monitoring at different locations and for personal use.

This invention results from the realization that the "effective volume" of water sampled by a passive sorbent unit can be estimated based on the ratio of two or more elements, preferably having similar sorbtive properties, where the concentration of one of the elements is previously known. Measuring an additional parameter, such as location, time, temperature, pressure, pH, carbonate levels, magnetic field, radioactivity, and/or salinity, assists in identifying overall properties of the sampled water and matching it with other samples and conditions at the time of sampling.

This invention features a monitoring assembly, system, and method to measure selected properties of an amorphous medium such as water, including a carrier suitable for immersion in the amorphous medium and a sorbent module held by the carrier, capable of being exposed to amorphous medium of interest, and having at least one type of sorbent material capable of capturing at least a first, target item and a second, reference item in the amorphous medium during a sampling period. The sorbent material is capable of capturing at least one of the target item and the reference item.

The captured target item and the reference item preferably have similar chemical properties. In a number of embodiments, at least one sensor module measures at least one parameter that is associated with the sampling period for the sorbent module. In some embodiments, the sensor module is held by the carrier in proximity to the sorbent module at least during the sampling period.

The monitoring assembly is designed to be a wearable member such as an ankle bracelet, wrist bracelet, arm band, leg band, patch, wrap, bandage, headband, finger/hand band, foot/toe band, necklace, belt, waistband, sock, bootie, or at least attached to a region of the body. In certain embodiments, the carrier includes a wearable band-type member. In other embodiments, the carrier is a tethered to an individual as a towable container which houses both modules. In yet other embodiments, the carrier is insertable into an object such as a surfboard, a paddleboard, a kayak, or other watercraft.

In a number of embodiments, the sensor module measures at least one of location, time, temperature, pressure, pH, carbonate levels, magnetic field, radioactivity, and salinity of the water during the sampling period. In one embodiment, the sensor module includes an absorbent material such as sponge material or capillary to capture a quantity of water. In some embodiments, a first sorbent material captures the target item and a second sorbent material captures the reference item. In certain embodiments, the sorbent module contains a plurality of beads of at least one type of sorbent. In one embodiment, the first target item is a radionuclide such as cesium-137 and/or cesium-134, strontium-90, or plutonium.

The sorbent module may be adapted to capture a target item such as a trace element, chemical, biological component, pathogen, toxin, or pesticide from a quantity of water.

This invention further features a method for measuring at least one property of water, including selecting an assembly having a carrier and a sorbent module held by the carrier, capable of being exposed to water of interest, and capable of capturing at least a first, target item and a second, reference item in the water during a sampling period. The sorbent module has at least one sorbent material capable of capturing at least one of the first, target item and the second, reference item. The method further includes exposing the sorbent module to the water of interest during the sampling period while capturing at least one parameter that is associated with the sampling period for the sorbent module. The concentration of the target item in the water of interest is determined by comparing it to the amount of reference item captured during the sampling period. Preferably, when the water of interest is seawater, the sorbent material functions even when immersed in seawater.

BRIEF DESCRIPTION OF THE DRAWINGS

In what follows, preferred embodiments of the invention are explained in more detail with reference to the drawings, in which.

DETAILED DESCRIPTION OF THE PRESENTLY PREFERRED EMBODIMENTS

The invention described herein provides a personal use item enabling the measurement of an aspect or quality of water. The item is intended to accompany an individual entering a body of water (e.g., a swimmer, surfer, diver, or worker) and sample the water for the desired aspect (presence of nuclear contamination, pathogens, etc.). The item may electronically relay information regarding the aspect to be measured, or alternatively save or record information for subsequent analysis, The invention may be accomplished by an assembly, system, and method for measuring selected properties of an amorphous medium (e.g., water, air, gas, mud, liquid, colloid, solid, vapor), including a wearable carrier suitable for immersion in water and a sorbent module held by the carrier and capable of being exposed to water of interest. The sorbent module has at least one sorbent material capable of capturing at least one of a first, target item and a second, reference item in the water during a sampling period. Preferably, an identifier capability such as at least one sensor module measures at least one parameter (e.g., temperature, pressure, pH, salinity, magnetic field, radioactivity, carbonate levels, location, time) which may be especially useful when tracking the ocean water properties that are associated with the sampling period. Additionally, a water collector such as a capillary tube, a sponge, or other absorbent or water-retaining device may be employed to further identify and/or verify the actual sampled water-mass.

Figure 1:
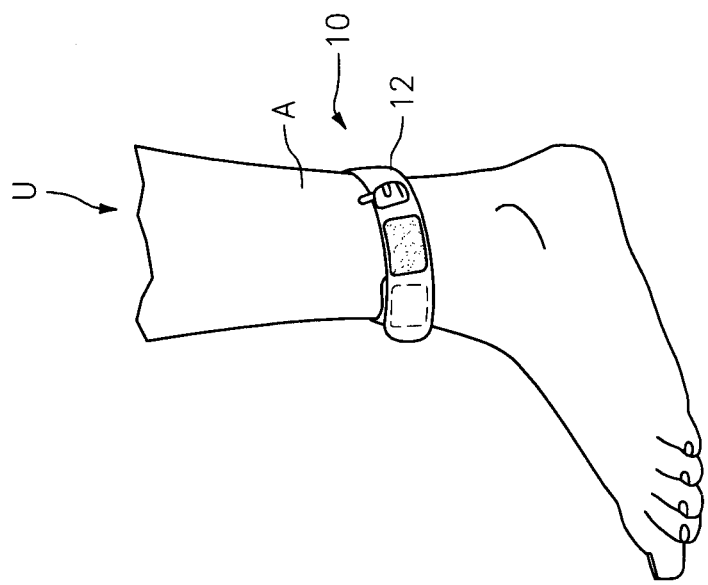
FIG. 1 is schematic perspective view of an environmental monitoring bracelet according to the present invention.
Figure 2:
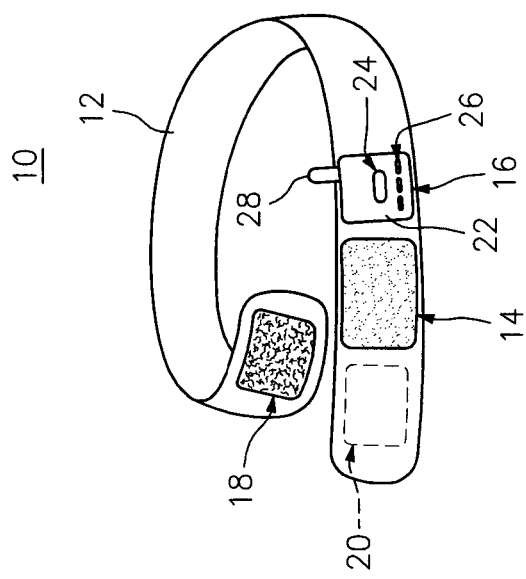
FIG. 2 is a schematic view of an ankle of a user wearing the bracelet of FIG. 1.

An environmental monitoring bracelet 10, FIG. 1, is one embodiment of the present invention which includes a carrier 12 as a wearable band-type member. Other wearable items suitable for use as a carrier or to which a carrier may be attached include a bandage, a wrist bracelet, arm band, leg band, patch, wrap, waistband, headband, finger/hand band, foot/toe band, necklace, belt, sock or bootie, ankle bracelet, or any suitable configuration for personal wear or removable attachment thereof, that supports a sorbent module 14 with at least one chemical sorbent, as described in more detail below, and a sensor module 16. In one construction, carrier 12 serves as an ankle bracelet as illustrated in FIG. 2 secured to the ankle A of a user U. In this construction, carrier 12 has mating hook and loop fasteners 18 and 20, FIG. 1, that secures one portion of carrier 12 to another portion of carrier 12; in other constructions, an adhesive or other fastening technique secures one or more portions of the carrier 12 to a user or other substrate. In one construction, sensor module 16 includes a water-resistant housing 22 (e.g., water-proof, water-tight) that contains a sensor probe for the sensing of a parameter (e.g., temperature, salinity, pressure, pH, radioactivity, time, location) and/or a GPS (Global Positioning System) unit with a display 24, a plurality of control buttons 26, and an antenna 28.

Figure 3:
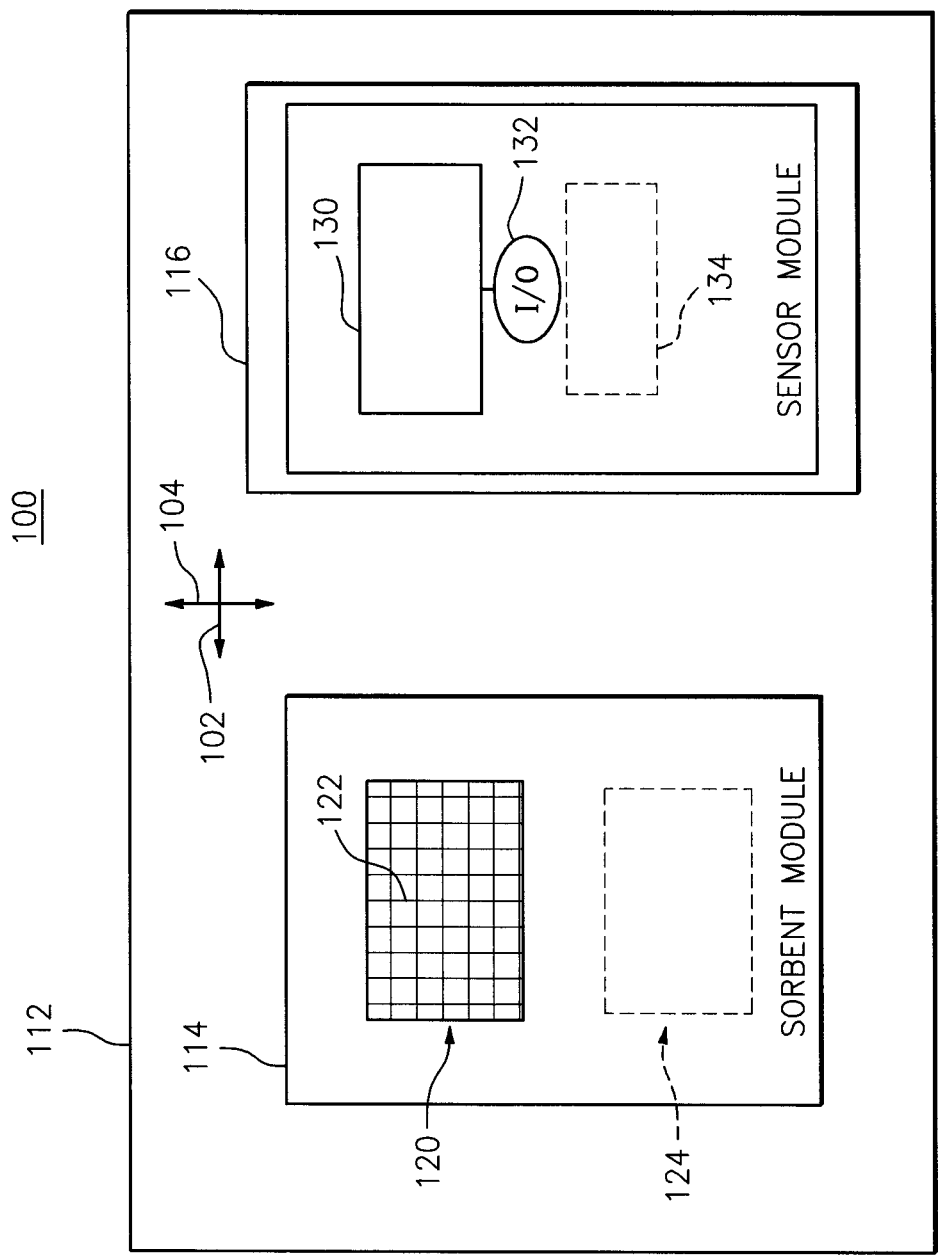
FIG. 3 is a schematic diagram of an assembly according to the present invention having a sorbent module and a sensor module.

Monitoring assembly 100, FIG. 3, also referred to as a sampler assembly 100, includes a carrier 112 for a sorbent module 114 and a sensor module 116 and in some embodiments, in a solid-state configuration (i.e., non-mechanical, no moving parts). Carrier 112 holds or secures together modules 114 and 116 in proximity to each other in this construction. In some constructions, carrier 112 is wearably attached by a band-type member such as a strap, a bandage, or a bracelet or wearable member that is capable of being fastened around an arm, wrist, hand, finger, leg, ankle, foot, toe, torso, waist, head, and neck of a surfer, a swimmer, a snorkeler, a diver, or other individual. The carrier may be comprised of materials suitable for immersion in such as silicone, fabric, plastic, metal, elastomer, or any natural or synthetic material suited for wear in an aquatic environment where the assembly may resist damage or malfunction when repeatedly splashed or immersed under water (i.e., capable of immersion in an amorphous medium).

Figure 5B:
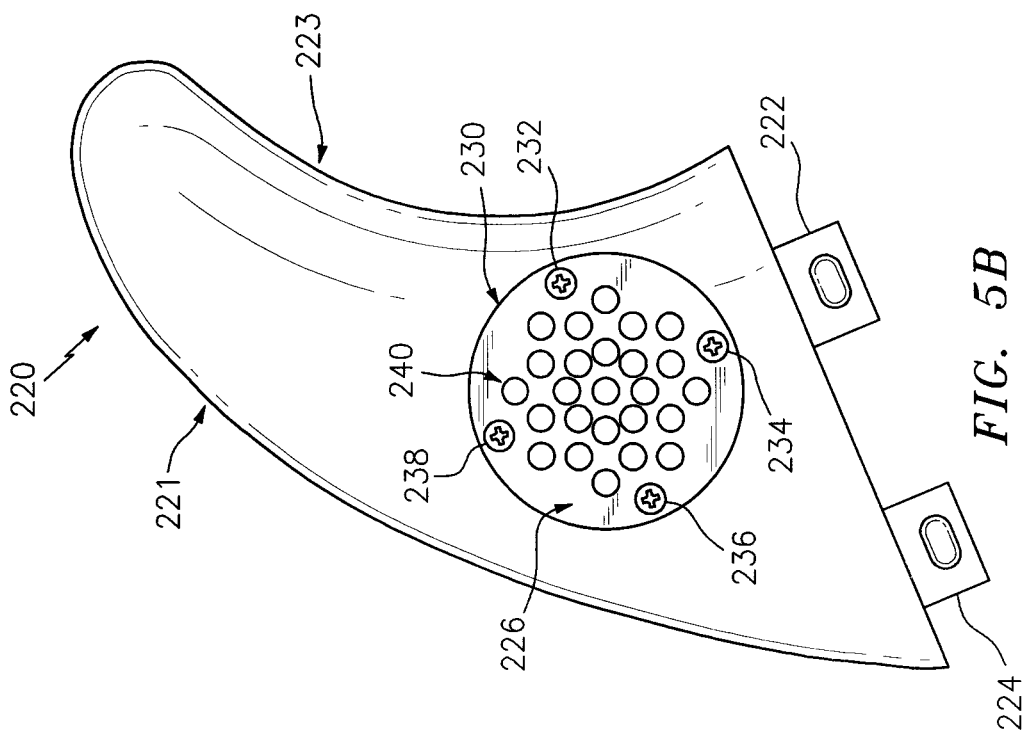
FIG. 5B is a schematic view of a specific embodiment of an assembly in the form of a recess in a fin of a watercraft to retain the sorbent module of FIG. 5A during immersion in water.
Figure 5A:
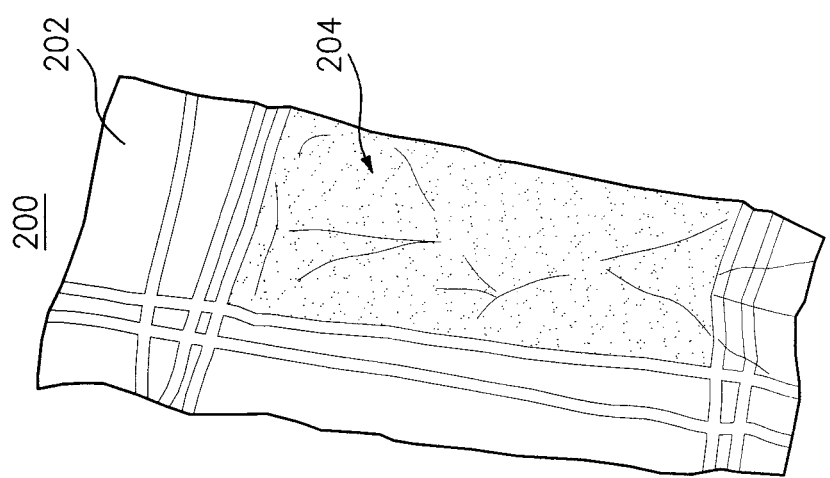
FIG. 5A is a schematic view of a sorbent module according to the present invention.

In other constructions, carrier 112 is a container-type holder or vessel that is torpedo-shaped or otherwise streamlined and towable behind a small watercraft (e.g., surfboard) or tethered to an individual user. In yet other constructions, carrier 112 has a low profile and is attachable to the hull or underwater protrusion of a watercraft, such as a skeg or rudder-post. In certain constructions, illustrated in FIG. 5B, a recess or hole is formed in a skeg, fin, rudder, or other immersible structure, and carrier 112 is a flexible mesh bag such as illustrated in FIG. 5A in one construction and, in another construction, is a cartridge (e,g., semi-flexible or rigid capsule or canister) that is removably insertable therein, preferably with a "snap-fit" or "click-in" action. One advantage of a cartridge-type container for the sorbent module is that, after sampling has been conducted, the cartridge easily can be removed and mailed to a facility for analysis. In some cases, the cartridge may be re-usable or may be disposable. Flow arrows 102 and 104 represent several different possible directions of flow of water, or other amorphous medium in which the assembly 100 is immersed, relative to the sorbent module 114 and, when included, the sensor module 116.

The sorbent module 114 has at least a first sorbent unit 120 containing at least one sorbent material (i.e., any suitable material capable of interacting and/or retaining a sample for analysis) that captures at least one of a first, target item and a second, reference item in the water during a sampling period. Suitable interactions may include hydrophobic interactions (e.g., hydrophobic salts, fatty acids, cholesterol), solid interactions (e.g., porous ceramics, bioglasses, absorbable polymers or copolymers, polysaccharides, zeolites), ionic interactions (e.g., charged particles), hydrogen bonding, covalent interactions, receptor/ligand interactions, antigen-antibody interactions, molecularly imprinted polymer interactions (Ensing et al. 2002), and other suitable affinity interactions.

The sorbent material may be any material capable of capturing a measurable amount of the target item of at least one trace element (e.g., heavy metals, arsenic, manganese, radon, uranium, boron, calcium), radionuclide (e.g., cesium, plutonium, strontium, iodine, cobalt), chemical (e.g., nitrates, nitrites, cyanide, ammonia, carbonate, antibiotics, phenol), biological component (e.g., protein, lipid, amino acid), pathogen (e.g., bacteria, virus, fungus, microbe, parasite, prion, viroid, protozoa), pesticide, toxin (e.g., domoic acid), or other parameter for immediate and/or future analysis.

Several suitable physical forms of the sorbent material are contemplated. In many constructions, the sorbent material is granular in structure (e.g., beads, grains, particles) and in some cases embedded in a resin or matrix of proper porosity, hydrophilicity, size, cross-linking topography, etc. for sorbtive purposes. A synthetic or organic matrix or resin composition comprising polymers (e.g., polyacrylonitrile), nanofibers, plastics, ceramics, silica gels, aluminas, porous carbons, microporous materials, mesoporous materials, macroporous materials, cell-based materials, aerogel, or other similar materials capable of facilitating the interaction between the sorbent material and the target item may be used. Other constructions employ a "solid-state" sorbent material substantially compact in composition such as a strip, dipstick, band, stick, bar, or of the like composed substantially or entirely of the sorbent material of choice or integrated with a matrix in a solid form.

A permeable barrier 122 such as a mesh, membrane, or perforated polymeric material allows water to pass through the sorbent material. In one construction, a non-permeable water barrier such as a foil or plastic seal cover lies across permeable barrier 122 and restricts water entry until it is removed (e.g., manually, triggered, dissolved). At least a second sorbent unit 124, indicated in phantom, is provided in some constructions to enable a second sorbent material to be exposed at the same time and under the same conditions as experienced by sorbent material within unit 120. In other constructions, unit 124 includes a non-permeable barrier so that sorbent material within unit 124 can be exposed over a different sampling period.

The length of the sampling period may be as little as less than 1 minute up to 30 minutes, up to 1 hour, up to 6 hours, or even longer spanning days up to weeks depending on the configuration and location of the inventive assembly.

The sensor module 116, also referred to as an instrument package, preferably contains at least one device 130 to capture, that is, to document, record, receive, signal, motion, and/or transmit data on at least one parameter that is associated with the target item(s), the reference item(s), the environmental conditions (e.g., temperature, pressure, pH, salinity, magnetic field, radioactivity, carbonate levels), location (e.g., GPS), time, or other desired parameter during the exposure period for the sorbent module. This information assists identification and/or verification of the actual water-mass being sampled, which may be especially useful when tracking ocean currents, plumes, or other localized phenomena. An "identifier function" for the sampled water may also be provided by water collected from the sorbent bed or, in other constructions, by adding a collector of water such as a capillary tube, a sponge, or other absorbent or water-retaining device or material.

In some embodiments, the sensor module 116 may comprise instruments for direct readout of the sampled target item or other parameters as described previously. For measurements of potentially dangerous targets such as radionuclides, pathogens, and toxins, the sensor module 116 may trigger a signalling means to inform the device's user. A signal may be generated by the presence of a certain target item or when the concentration of the target item reaches a predetermined threshold or limit. In some instances, the sensor module 116 utilizes a visual cue to alert the user which may be a light, a color indicator or change, an image, or other observable signal. Other instances may rely on a physical cue such as a motion (e.g., vibration), a sound (e.g., alarm), and/or a combination of signals visual and physical. The sensor may also only report the target item data to a remote location without signalling to the user.

An Input/Output (I/O) member 132 includes data storage media in some constructions and, in other constructions, includes a transmitter and/or receiver. In some embodiments, the sensor module 116 further comprises a means for wired or wireless communication such as Bluetooth, satellite, optical, acoustic, or RFID (radio-frequency identification) transmission. The sensor device 130 includes a memory or other data storage media in some constructions. The I/O member 132 includes a sampling port in some constructions, such as when salinity or other additional parameter is measured.

Figure 4:
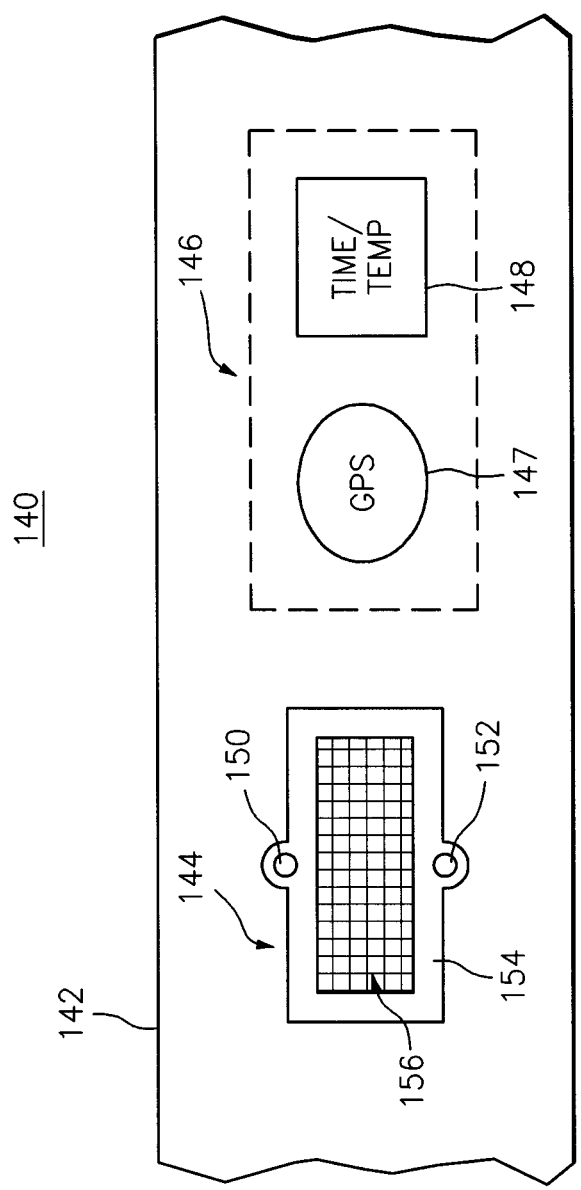
FIG. 4 is a schematic view of sorbent and sensor modules attached to a band element that is wearable by a user.

Sampler assembly 140, FIG. 4, is a low-profile, wearable system utilizing a strap 142 as the carrier for a sorbent module 144 and a sensor module 146 having a GPS unit 147 and a time and/or temperature unit 148. The sorbent module 144 is removably secured to the strap 142 by one or more fasteners, such as cable ties, fastening pins, stiches, or the like, passing through holes 150 and 152 defined in holder 154. One or more types of sorbent material are held by permeable membrane or mesh 156. In one construction, sorbent module 144 holds approximately 5 ml of sorbent material. In other embodiments, the sorbent module 144 holds 10 µl up to 1 ml, up to 2 ml, up to 3 ml, up to 4 ml, or greater than 5 ml and in some case up to several liters.

Sorbent module 200, FIG. 5A, includes a flexible mesh bag 202 which holds at least one sorbent material 204. In one construction, a fin or skeg 220, FIG. 5B, has a leading edge 221, a trailing edge 223, and pegs 222 and 224 to removably engage fin 220 with a watercraft such as a surfboard, a kayak or a sailboat. Fin 220 further includes a cavity or recess 226 formed in fin 220 and which is removably covered by a plate 230, secured by fasteners 232, 234, 236, 238 such as stainless steel screws in this construction, and having a plurality of openings 240 to admit fluid into the cavity 226. Sorbent module 220, FIG. 5A, is removably placeable into the cavity 226, FIG. 5B. Openings 240 are holes in plate 230 in some constructions and, in other constructions, are covered by a screen, mesh or grate. In one construction, the recess 226 passes completely through fin 220 to form a passage and a matching plate (not shown) covers the opposite end of the passage. In another construction, a scoop-type member increases fluid flow over the sorbent module. In yet other embodiments, a cavity is formed in at least one of leading edge 221 and trailing edge 223. It is desirable to maximize fluid flow across the sorbent material while minimizing interference with the principle functions of the fin 220 such as stabilization of the watercraft.

A variety of light-weight, water-proof instrument packages to record GPS location and temperature are available, as of the filing date of this priority application, from companies such as Telemetry Solutions. See tracking devices at "http://www.telemetrysolutions.com/track-wildlife/gps-for-small-birds.php". A portable self-recording data acquisition device with internal clock is available from Onset Computer Corporation of Massachusetts that is waterproof to 300 meters (1,000 feet). Temperature can be measured from −20° C. to 70° C. (−4° F. to 158° F.) see "http://www.onsetcomp.com/products/data-loggers/utbi-001".

A device that can be worn, for example, as an ankle or wrist bracelet or attached to a member of apparel (e.g., hat, mask, head wrap, wetsuit, gloves, shirt/jacket, pants, boots, or other suitable wear) has the ability to monitor ocean properties while in the water swimming, surfing, diving, or enjoying other water activities. In some embodiments, the device may pin, be sewn, attach by suitable fasteners (e.g., mating hook and fastening hooks), glue, tape, or otherwise mount to the outer or inner portion of the apparel to allow sampling and measurement of the target item and other desired parameters.

Multiple components may be combined in one device to effectively monitor multiple ocean properties (e.g., target items, environmental conditions). In some constructions, a small wearable Geiger counter is included to provide real-time audio, vibrational, and/or visual warning to a first responder encountering potentially hazardous radiation levels and additionally may notify a third party through a wired or wireless communication means. Additionally, in some embodiments, the sensor device 130 is capable of comparing the detected sensor readings against known predetermined limits and delivering a warning signal to the device operator. In one construction, a plug-in adaptor for a smart phone enables data transfer to a computing device or to a communication network. Furthermore, the inventive device may be configured to communicate or stream data directly to a smart phone in real-time for data storage or to further stream to another remote location such as a facility.

The main design features include a means to contain or hold at least one target item-specific sorbent material such as a permeable membrane tube, bag, or container, or solid piece of sorbent material (i.e., solid-state form, fixed form) that is substantially insoluble in an amorphous medium and, when exposed to the amorphous medium, adsorbs the target item proportion to their concentrations in the fluid (adsorption is used here for any sorption process). In one construction, the monitoring assembly and/or the sorbent module is a "solid-state" device in finger-type bandage or strip form carrying at least one target item sorbent. In some constructions, one or more integrated components of the device may provide sample location, such as by GPS positioning, and/or additional data such as temperature, salinity, pH, and other mentioned water or environmental properties or environmental conditions being sampled. Preferably, collected data is stored in the sampler for future retrieval or reference. Other chemical and biological sensors and/or collectors are included in other constructions.

The electronic circuitry and/or sensors may include a power source in the form of a battery and/or a solar cell (i.e., photovoltaic cell) which may be rechargeable and/or replaceable. In constructions employing a solar cell, the power source may collect and store electromagnetic charge in the presence of sunlight as a means to power the inventive device or to charge another battery within the device.

The basic principle is that the total amount of any unknown target item picked up by the sorbent material is a measure of the amount in the ocean, but the overall volume of sampled water, known as the "effective volume", needs to be known to determine concentration. This effective volume can be deduced for many elements from the ratio of two or more isotopes that have similar chemical properties (e.g., element type, proton number), when the concentrations per liter, or other volumetric measurement, of one of the isotopes or stable compound is known from prior studies or measured properties. Preferred target isotopes include cesium (Cs), strontium-90, and/or plutonium.

A specific application is for the determination of the human made radionuclides cesium-137 and cesium-134 concentrations in the ocean through sorption of cesium onto fibers or resin materials that are immersed in the ocean and later analyzed in the lab. The concentration of radioactive cesium can be determined by knowing the expected concentration of stable cesium (cesium-133) in the ocean, and by measurement on the sorbent material of the ratio of stable Cs to the radioactive Cs isotopes.

As mentioned in the Background above, a resin that incorporates active KNiFC associated with inorganic ion exchangers embedded with modified polyacrylonitrile (PAN) as a binding matrix is described by Sebesta in "Composite sorbents of inorganic ion-exchangers and polyacrylonitrile binding matrix", J. Radioanalytical and Nuclear Chem., Vol. 220, No. 1, 77-88 (1997). Copper ferrocyanide has also been used for cesium sorption in association with fibers, as discussed by Buesseler et al. in "Determination of Fission-Products and Actinides in the Black Sea Following the Chernobyl Accident", J. Radioanalytical and Nuclear Chem., Vol. 138, No. 3, 33-47 (1990). Another resin useful with the inventive device may include ammonium molybdophosphate (AMP) incorporated with a binding matrix. Such binding matrices comprising the sorbent may be in the form of beads (i.e., grains), sheets, fibers, strips, powder, or any suitable composition to effectively allow the resin to interact with water.

In either case, a permeable membrane design, such as an open tube or a mesh bag serving as a carrier for the sorbent, such as sorbent module 200, FIG. 5A, allows water to flow passively and freely through the target selective sorbent materials thus increasing or concentrating the cesium signal relative to whole water sampling. The sorbent materials can be formed as beads, fibers, sheets, strips, or other shapes. The size or shape of the sorbent, such as bead size, can be altered to change water flow through the sorbent material; for example, a larger bead size may increase water flow past the beads. Suitable beads may include bead sizes up to 0.1 mm, up to 0.2 mm, up to 0.4 mm, up to 0.6 mm, and up to or equal to 1 mm. In some cases, even larger grains or beads are employed, including beads up to 10 mm, 20 mm, or up to 100 mm or more. Preferably, the sorbent materials will adsorb the target and reference items even in the presence of salinity and ionic activity as is found in ocean waters.

In this application, if the concentration of stable Cs (cesium) in the ocean is known to be X units per liter of seawater and the sorbent material is analyzed and contains a measured total of 2X units of Cs, then the "effective volume" that the sorbent has been exposed to is 2 liters. This key step eliminates the need for measuring sample volume. Due to the identical chemical properties of stable and radioactive Cs, this same estimated volume may be applied to determine the concentration of the measured amount of radioactive cesium from the sampled water. Thus if we measure the total activity of $^{134}$Cs and $^{137}$Cs on the sorbent, this activity would be divided by the same effective volume, to determine concentrations. In this example, a radioactive concentration of Y units of $^{137}$Cs would be the amount of $^{137}$Cs associated with 2 liters in this sample, so Y/2 is the concentration (commonly reported for $^{137}$Cs and $^{134}$Cs in radioactivity units of Bequerels per Liter).

So, without measuring the volume directly, the radionuclide concentrations of $^{134}$Cs and $^{137}$Cs that may be of human health concern can be determined. As the cesium levels expected in most of the world's ocean are only a few milli-Bequerels per Liter, the determination of radioactive cesium isotopes requires concentration via the sorbents, and for analyses, high sensitivity instruments and long counting times using high purity germanium detectors that can distinguish each Cs isotope by their different gamma decay energies. Stable cesium is determined by quantitative dissolution of the sorbent followed by dilution with nitric acid and analyzes using an Inductively Coupled Plasma-Mass Spectrometer.

A second method to use these sorbents for quantifying cesium isotopes is unique to Fukushima given the known and constant activity ratio of $^{134}$Cs/$^{137}$Cs from Fukushima Dai-ichi in March 2011 ($R_{Fuku}$=1.0). Given the different decay properties of $^{137}$Cs (half-life for radioactive decay=30.17 years) and $^{134}$Cs (half-life=2.065 years), and a relatively uniform activity of $^{137}$Cs in the ocean from atmospheric nuclear weapons testing fallout prior to Fukushima ($^{137}$Cs$_{wt}$=1.5 Bq m$^{-3}$ in the Pacific and there is zero $^{134}$Cs$_{wt}$), one can calculate the concentration of Fukushima derived cesium in the ocean using the formula:

$$R_{meas}=R_{Fuku}-[R_{Fuku}*(^{137}Cs_{wt}/^{137}Cs_{meas})] \quad \text{EQ. 1:}$$

where $^{137}$Cs$_{wt}$ is the cesium-137 from weapons testing and $R_{meas}$ is the $^{134}$Cs/$^{137}$Cs activity measured on the sorbent materials (Buesseler et al., 2012). The only unknown in this equation is $^{137}$Cs$_{meas}$ which can be calculated to determine the activity of Fukushima $^{134}$Cs per liter given the consistency of $^{137}$Cs$_{wt}$ activities in many oceans. This method is less precise than by measuring stable Cs to determine the effective volume, but useful at activities of $^{134}$Cs<1-10 Bq m$^{-3}$, above which little change in the $^{134}$Cs/$^{137}$Cs ratio is observed (this ratio saturates at 1.0 when $^{134}$Cs activities are 10× or more greater than $^{137}$Cs).

The same principle of determination of chemical and biological concentrations can be applied to other elements in the ocean using chemically selective sorbents of different properties (Hartman and Buesseler, 1994), and measurement of the ratio of different chemical components to each other and known concentrations in seawater. For example, the concentrations in the ocean of many so-called "conservative" elements are known by their constant relationship to salinity, a parameter easily measured with sensors. Examples include uranium, potassium, sodium, bromide, boron, fluoride, chloride and to within a percent by concentration in most oceans, elements such as strontium, magnesium, radium, thorium, calcium, and sulfate (in oxic conditions only). By knowledge of sorption affinity in the sorbent material of conservative elements to other non-conservative elements such as mercury, lead or zinc, then effective volumes can also be determined for the non-conservative elements. Isotopic ratios of single elements can always be determined even without knowing the effective volume of sampled water. Parameters to incorporate in certain constructions include heavy metals, pathogens, bacteria samples, toxins including domoic acid, and fecal testing for contaminated water bodies or beaches.

Sorbents for biologically active components such as gels, agars, porous ceramics (e.g., calcium phosphates) or plastics (e.g., HDPE) may be used to capture target species of algae bacteria, plankton (e.g., phytoplankton, zooplankton, dinoflagellates, diatoms), and other inorganic and organic biomarkers of the local marine ecosystem. For example, one or more chemical or biochemical markers such as a lipid, a protein, and/or an amino acid can be utilized to detect fecal coliform bacteria, to locate sewage outfalls or spills, or to detect "red tide" dinoflagellates.

In some constructions and with respect to Freebersyser et al. 2010, Carey et al. 2011, and U.S. Pat. No. 5,413,916 incorporated by reference, the monitoring assembly may be employed to detect the presence of one or more specific species, strains, or phyla of bacteria (e.g., Gram-positive, Gram-negative) or protozoa including *Helicobacter* spp., *Streptococcus, Pseudomonas, Salmonella, Legionella, Escherichia coli, Staphylococcus, Legionella, Chlamydia, Campylobacter*, fecal coliform and fecal indicators (e.g., *Enterococci*, coliphage), or other bacteria or bacterial markers of interest. Although several approaches may be envisioned, methods for the qualitative detection of bacteria may use a sorbent material capable of interacting with the target pathogen of interest (i.e., target item). In many instances, the target item is detected though an antigen-antibody interaction which are based upon molecular recognition of surface proteins. Other cases may utilize a molecular imprinted polymer which in principle mimics the interaction of antibodies by presenting a molecular imprint on the surface of the sorbent polymer capable of specific interaction with the target item. Furthermore, a visual indication may be produced through a colorimetric assay in the presence (or absence) of the target item using chemically responsive dyes, metalloporphyrins, metal salts, solvatochromic dyes, pH indicators, or similar means.

Other sorbent materials may involve a chemical change or enzymatic reaction including reduction or oxidation of a colorimetric indicator (e.g., resazurin) for detection. The sorbent material may comprise a coated membrane, adherent surface, or a solid support in a variety of compositions, but most often in the form of a strip, dipstick, sheets, disposable sensor, or other similar structure. The sorbent module 114 may also comprise an indicator reagent or may be mixed with an indicator reagent to produce a color change indicative of a positive (or negative) result. The colorimetric sensor may be integrated into the sorbent module 114, attached to the sensor module 116, or independently attached to the monitoring assembly as an additional sensor.

Other biological sensing methods may include nanoparticle-based sensor arrays (Miranda et al. 2010; Patent Application No. PCT/US2014/054,856). Biomolecular target items may be identified employing fluorescent polymer/metallic complexes or other nanoparticle complexes to detect the presence of bioanalytes such as bacteria, proteins, molecules, or specific types of cells. In some constructions, the nanoparticle-based sensors provide a rapid colorimetric readout; other constructions allow sample detection and recovery for later analysis.

Similar detection and identification assays may also extend to other pathogens including viruses, fungi, phytoplankton, zooplankton, or other biological interests. Viruses of interest, particularly concerning the contamination in water sources, include Cryptosporidium, Giardia, Ebola, Enteroviruses, Flaviviruses, Retroviruses, Human adenovirus, Astrovirus, Parvovirus, Torovirus, Coronavirus, Rotavirus, Hepatitis A virus, Hepatitis E virus, Norovirus, or any other viruses for detection.

Data collected could be distributed using a web site and user friendly phone apps used that allow one to use the mobile device to determine one's location, or choose a different site, to download ocean properties at any given site and time, i.e. the "how radioactive is my beach" app. For an example of a land-based app for radioactivity monitoring, see "https://itunes.apple.com/us/app/safecast/id571167450?mt=8" for one version of this software application.

Data can be remotely uploaded from one or more electronic components of these devices, and/or returned to a ship-based or shore-based lab for downloading. One technique suitable for receiving uploads underwater from one or more devices according to the present invention is described by Farr et al. in U.S. Pat. No. 7,953,326. As previously discussed, data may be configured to transmit via a wired or wireless communication source such as Bluetooth, satellite, RFID, or other suitable transmission means.

The following example describes a specific embodiment of the inventive system and method, which is included to further illustrate certain aspects of the invention and are not intended to limit the invention.

Example 1

To monitor Cs over a larger spatial scale, a method that can achieve faster collection of samples in situ is required. An in situ sampler is being modified for this purpose. This sampler will be deployed on an autonomous vehicle (JetYak) for broader scale sampling. Additionally, devices containing KNiFC-PAN that can be worn or attached to personal watercraft are being developed with the goal of increasing public participation in the monitoring of radiocesium in the ocean.

In 2011 the Japan coastline was hit by a category 9 earthquake and tsunami that caused major destruction to the Fukushima Dai-ichi Nuclear Power Plants (FDNPP) and the largest ever accidental release of radiocesium to the ocean. Since the accident, there has been mounting concern along the U.S. and Canadian west coasts about human exposure to irradiated waters coming from Japan. These concerns lead to an increased need for monitoring of cesium along Pacific coastlines.

Faster and more reliable methods of extracting and measuring cesium needed to be developed to improve monitoring of cesium in the ocean. In June 2011, an absorber made from ammonium molybdophosphate (AMP) bound to modified polyacrylonitrile (PAN) beads, created by researchers at the Czech Technical University in Prague (Sebesta, 1997) was used to extract radiocesium from the ocean around coastal Japan (Buesseler et al., 2012; Pike et al. 2012). This method involved collection of a 20 L seawater sample filtered and processed through a column containing AMP-PAN. The AMP-PAN method involved 8 hours of process time and proved to be both more reliable and much quicker than previous cartridge methods (Pike et al., 2012). A drawback to the method was the need to acidify samples prior to processing. In 2012 we began using a new absorber, potassium nickel hexacyanoferrate bound onto modified polyacrylonitrile beads (KNiFC-PAN) (Sebesta et al., 1997; Kamenick et al., 2012). KNiFC-PAN is in bead form and behaves similar to a resin that extracts a desired isotope from a sample. The primary advantage of this resin is the lack of acidification of samples prior to processing. This method has been used to process 20 L samples collected on several cruises off the Japan coast and for our crowd funded project along the U.S. and Canadian Pacific coasts.

Our Radioactive Ocean (www.ourradioactiveocean.org) is a crowd-funded campaign developed in 2013 to begin monitoring radiocesium along the west coast of the U.S. and Canada following increasing public concerns. Kits containing 20 L cubitainers are sent out to citizen scientists to collect and shipped back to the laboratory for processing. We have been able to process samples via our 20 L KNiFC-PAN method, count via gamma spectroscopy and post results quickly to reassure public that the ocean and local beaches are safe for recreational activities and fish consumption. The high interest in monitoring of cesium along the west coast has led to the initial development of new methods to improve monitoring of radionuclides in the ocean.

We have since developed and began testing of a RadBand, a mesh bracelet containing KNiFC-PAN absorber that can be worn around the ankle. Other versions of this, such as putting absorber inside a surfboard fin are also being developed. With passive adsorption, cesium sorbs to the resin beads. Cesium can then be extracted from the absorber through a digestion process. Radiocesium is measured via gamma spectroscopy while stable Cs is measured via ICP-MS.

Most recently, an instrument capable of capturing cesium samples in situ, a Rad version of a Clio SUPR Sampler was developed by John Breier and others at the Woods Hole Oceanographic Institute (Breier et al., 2014). The Rad Clio SUPR sampler is deployed on an autonomous vehicle called a JetYak, (a vehicle resembling a kayak that can be propelled remotely). The JetYak carries the Rad version of Clio along a transect. The sampler is programed to pump water through a designated cesium column. When the transect is complete, the instrument switches to a new column, so that a new transect and sample can be collected. This instrument essentially eliminates process time and allows for greater spatial coverage. In the future, this could permit remote monitoring of radionuclides in the ocean.

In this example, we present several new methods and applications of KNiFC for improved collection and monitoring of radiocesium in the ocean. Some of these methods are already being used extensively for research programs (20

L methods), while others (Radband and autonomous vehicles) are still in conceptual and developmental stages.

20 L cubitainer method: Samples collected by this lab since 2012 have been processed using the KNiFC 20 L cubitainer method. This method is similar to the AMP-PAN method (Pike et al. 2012), except in this case no acid is added prior to processing, a different column is used, and samples are pumped at a faster flow rate (Table 1). Samples were weighed then filtered through a 1 μl Hytrex pre-filter to reduce particle load that slows processing. A stable $^{133}$Cs salt (25 mg/ml) was added to each sample to determine recovery of Cs on the column by taking an initial and final aliquot from the sample and eluent, respectively. Samples were allowed to equilibrate for at least 1 hour prior to processing. Columns (Supelco brand—5 ml empty rezorian tube kit) were filled with 5 ml of KNiFC-PAN absorber. A polyethylene fit (Sigma Aldrich) was placed at the bottom and top of the column. Samples were pumped directly from a cubitainer through columns at 60 ml per minute. Processing takes approximately 5.5 hours. KNiFC absorber was transferred to scintillation gamma vials and dried at 60° C. prior to counting on 3 different high purity germanium well detectors (HPGe). These detectors have an energy range of 10-2800 KeV and detection limits of 0.001 cps. Gamma efficiencies were determined from standards made from a matrix of KNiFC-PAN spiked with certified Eckert and Ziegler Isotope Products $^{134}$Cs and $^{137}$Cs standards. Recovery on the column was determined via ICP-MS. To determine recovery, initial and final aliquots were diluted 30× in a 10% JT Baker ultrapure nitric acid solution and stable $^{133}$Cs concentrations in the aliquots were measured on an Element II ICP-MS (Thermo-Finnigan MAT GmbH, Bremen, Germany) at low resolution (see Pike et al., 2012 for further details).

Large volume KNiFC-PAN method: To improve speed and efficiency of processing, we initially developed and tested a column to pump 100 L of seawater at 450-500 ml/min. A 100 kg seawater sample was spiked with 15.4 Bq/g $^{134}$Cs and 15.1 Bq/g $^{137}$Cs. The entire 100 kg sample was pumped through a clear PVC column with 3.2 cm diameter and 5.1 cm long for a bed volume of 18 ml wet KNiFC absorber. The KNiFC-PAN was sandwiched between two frits. Sample eluent was collected in 5×20 L sections. Each 20 L cubitainer of eluent was then processed through 5 ml of KNiFC as in the 20 L cubitainer method to determine efficiency loss at the faster pumping speed.

RadBands and KNiFC Digestions: To increase public involvement in cesium monitoring, we designed the RadBand, a mesh bag that contains KNiFC resin that can be worn or towed through the water. The concept of the RadBand relies upon the conservative behavior of stable $^{133}$Cs in the ocean, which at salinities near 33 ppt is 0.5 ppb. Because this concentration is known, we can determine the effective volume that has been seen by the absorber in the passive mode by extracting and measuring stable $^{133}$Cs in the sample via ICP-MS.

RadBands were made by cutting rectangles of 90 um Nitex® mesh (based on PAN bead diameter) then filling with 5 ml of wet KNiFC-PAN and sealing edges. Resin sat loosely in a 10×5 cm rectangle and was kept wet prior to use. Multiple bag and mesh sizes and configurations were tested in the lab. Mesh sizes smaller than 90 um had lower efficiencies due to reduced flow. The size of the bag also proved important. RadBands that had resin more tightly packed had lower efficiencies, therefore having the bag large enough is important for maximizing water flow.

RadBands were tested in May and October of 2014 on two separate cruises off the coast of the Fukushima, Japan. RadBands were deployed at station NP0, approximately 2 km from the Fukushima NPP, at a depth of 0.5 M. During the May cruise, samples were towed alongside the ship at a 2 knots for 2-5 hours. During the October cruise, samples were collected while stationary at NP0. At the same station and during the 5 hours, multiple 20 L cubitainer samples were collected and later compared to the RadBand samples. All samples were counted via gamma spectroscopy and exposure volumes for the bands were estimated based upon measured $^{134}$Cs and $^{137}$Cs values from co-located 20 L samples collected at the same time.

RadBands were also tested on the ankle of a surfer and towed behind a surfboard. Recently we designed a prototype of a removable surfboard fin with a cut-out to put a mesh bag with KNiFC inside so that cesium can be collected as the surfboard moves through the water (FIG. 5). Upon return to the lab, absorbent in the RadBands were transferred to vials and gamma counted wet. Wet standards (5 ml) of KNiFC were made to determine detector efficiencies. Samples were kept wet in this case as it improves recovery of the cesium during the digestion process that is used to recover and calculate the volume of water the sample was exposed to.

Initial digest tests to extract radiocesium from KNiFC-PAN were performed at the Czech Technical University in Prague; by digesting the absorber in 10 ml of a 10% solution of AgNO$_3$ in DI water, followed by a rinse with 10 ml of DI water. These tests were able to remove 99% of the cesium from the absorbent. Lab tests at WHOI began in 2014 on seawater samples on both spiked ($^{137}$Cs standard, Eckert & Ziegler) and un-spiked, natural samples. The digestion process takes only 20 minutes. Samples were counted wet prior to digestion by gamma spectroscopy to obtain initial values. To digest samples, 5 ml of wet KNiFC-PAN sample was placed in a 40 ml centrifuge vial with overlying water removed and 20 ml of AgNO$_3$ solution was added. Samples were stirred vigorously, shaken intermittently for 20 minutes and allowed to settle. Supernatant was removed and placed in a tared vial. A further rinse of KNiFC with 5 ml of DI water was done to ensure complete removal, added to the tared vial and total weight was recorded. The liquid sample was then measured via gamma spectrometry. A liquid standard was used to calculate detector efficiencies.

To measure recovery of stable cesium via mass spectrometry, an aliquot was removed from the supernatant and diluted in a 10% solution of JT Baker ultrapure nitric acid. A Finnegan Element II ICP-MS was used to measure stable Cs in low resolution mode. The concentration of $^{133}$Cs was determined using a standard curve made in the same matrix as the samples. Standard curves were run at the beginning, middle and end of the run to account for instrument drift over the run. Effective sample volume was calculated by dividing the measured concentration of stable $^{133}$Cs by the known ocean concentration of 0.5 ppb at salinities of 33. If salinities were not 33, the expected concentration of stable $^{133}$Cs was calculated by using a linear fit for expected conservative behavior. Radiocesium in samples was then calculated using effective volumes determined via ICP-MS.

In situ autonomous sampling method: In an effort to improve broad scale monitoring of cesium, the Rad Clio Sampler was designed to capture samples in situ. In January of 2015, the instrument was tested on a cruise around the Marshall Islands. This location was chosen as it has above background cesium levels leftover from bomb testing in the 1950s. The Rad version of Clio holds 16 smaller and narrower column (2.1×4.7 cm) that can be automatically switched during deployment. The instrument was deployed on a JetYak which can be programmed with GPS coordinates to follow a transect. Samples were collected along transects by automated pumping at 200-350 ml min$^{-1}$ through the columns. Transects were completed in about 1 hour, and covered 1-3 km distance. Upon recovery, columns were emptied into vials and immediately ready for analysis via gamma spectroscopy. Detector efficiencies were determined using a 14 ml KNiFC standard spiked with $^{134}$Cs and $^{137}$Cs reference standards (Eckert and Ziegler).

A comparison of the 6 different applications of KNiFC absorbents used is shown in Table 1 for this Results and Discussion section. Here, we will review results and compare the use of the various methods.

KNiFC 20 L method cubitainer method: The KNiFC 20 L cubitainer method proved very successful when employed during four cruises along the Japan coastline and offshore Japan in 2013-2014. Sample activities along these coasts were at background levels with an average $^{137}$Cs activity of 1.5+/−0.1 Bq/m3 and a range of $^{137}$Cs=0.6-1.9 Bq/m$^3$. $^{134}$Cs in coastal samples was below detection for all but one sample (N=77). We have seen only one coastal sample that contains $^{134}$Cs, the signature of waters coming from Fukushima. This sample was collected in Ucluelet, British Columbia and had above background $^{137}$Cs (6.1 Bq/m3) and detectable $^{134}$Cs (1.2 Bq/m$^3$). These levels although above background are still well below the U.S. and Japanese drinking water standards (7,400 Bq/m3) and are safe for recreational activities as well as fish consumption.

The KNiFC absorber proved very comparable in chemical extraction efficiency (95%) to the AMP-PAN absorber (93%) using the 20 L cubitainer method. The use of both KNiFC-PAN and AMP-PAN absorbers have similarly high extraction efficiency compared to two cartridge methods employed several years ago (Buesseler et al., 1990). The method is very reliable, with similar chemical extraction efficiencies seen in hundreds of samples. The ability to process samples at sea was improved with the KNiFC-PAN as no acid was required. Processing times between AMP and KNiFC were comparable, requiring between 6-8 hours. Although the process time for the 20 L cubitainer method is considerably shorter than previous methods, an in situ method that eliminates virtually all processing time would be ideal.

High volume collection: The objective of the high volume collection method was to increase speed of collection and to increase volume collected to reduce processing and gamma counting time. Initial tests of the 100 L method proved faster (100 L was collected in the 3.5 hrs), but chemical recovery was compromised. Our 18 ml column of KNiFC proved to be the least efficient, with a chemical recovery of 52-60% of the radiocesium captured in the initial 18 ml column. This was both our fastest pumping speed at 500 ml min$^{-1}$ and our largest diameter column so it is likely that the wider bed size and faster pumping speed contributed to make this a less efficient extraction method. The poor chemical recovery is possibly due to channelling around the absorbent and less ideal column dimensions. We do believe it is possible to get a better chemical recovery using KNiFC at faster pumping speeds with the right column however, as this was the evidence with our in situ sampler as well as work done in Kamenik et al., 2013.

Surfer bag/Crowd source application: Our surfer bag tests showed a range of success in recovering Cs from seawater in both natural and artificially spiked sample conditions. The most important factor proved to be the flow of water over the Radband as those that were towed from a moving boat or surfboard had much better results. In our first tests, a Radband was towed behind a surfboard in coastal New England for 2-3 hours. After counting on the gamma spectrometer for 2 days, we were able to measure 1.2+/−0.2 Bq/m$^3$ of $^{137}$Cs. Other samples were tested in a flume at a very slow flow rate of 1-2 L min$^{-1}$. These samples were still below detection after 12 hours of exposure. Greater success was obtained in Japan by towing RadBands from the ship at 2 knots for 3-4 hours. Results comparing our 20 L cubitainer method to the RadBands from two cruises can be seen in Table 1. In this case, we did not digest samples but estimated volumes based upon co-located cubitainer samples collected in similar time and space. Using the co-located cubitainer values, we were able to estimate that the effective volume seen by the RadBands during the two cruises was 16-36 L. Once transferred to a vial, these Fukushima RadBand samples required only 1 day of counting, partly due to the higher levels of $^{134}$Cs and $^{137}$Cs seen in these waters and partly because the larger effective volume of the sample.

The last step in this process is to measure stable Cs to determine the effective volume seen by the RadBands. This is done by digesting them in the AgNO$_3$ solution, and tested using added radiotracers as well as measuring stable Cs. Initial tests recovered an average of 83% of the $^{134}$Cs (from spiked samples) and $^{137}$Cs from both unspiked and natural seawater samples measured by gamma spectroscopy. The average recovery of $^{133}$Cs measured via ICP-MS was 74%. Recoveries measured via ICP-MS proved less reliable and less consistent. Because this was an initial test, samples were simply diluted prior to running without further chemistry or cleaning, thus further cleaning of the sample to reduce interferences and possible matrix effects is likely necessary.

The greatest benefits of the RadBand include the ability for citizen scientists to collect directly onto a KNiFC absorber. The method uses direct counting of the sorbent followed by only a quick 20 min digestion process for stable Cs compared to the 6-8 hrs of processing required for a 20 L cubitainer, but it does require measuring recoveries and effective volumes via ICP-MS. The greatest disadvantage is that without enough volume flowing through the RadBand, the sample can be below detection. Some samples had low effective volumes, so there is a need to improve flow over the absorber. We found that increasing flow around the resin increased extraction of cesium from the water for example by towing (such as behind a surfboard or kayak), or alongside a slow moving boat during collection. Significant work will be needed to optimize the design to improve flow conditions for different applications.

Marshall Islands/Autonomous sampling: In situ sampling of radiocesium with the JetYak vehicle and Rad version of Clio SUPR sampler proved very successful. Surface samples collected by vehicle and co-located cubitainers on Enewetak, Medren and Runit Islands in the Marshall Island chain ranged from 1.3-3.3 Bq/m$^3$ $^{137}$Cs. Seawater volumes were both measured from a flow meter on the instrument during pumping and estimated comparing Cs collected to co-located cubitainer samples that were processed via 20 L method above, in cases where the flow meter was not functioning properly. An estimated 12-25 L of seawater was pumped through each column during six, 1-2 hour transects along the islands.

The advantages of in situ sampling are great: collection is automated, the vehicle can be programmed to move along a path and collect samples at designated locations, sample process time is essentially eliminated as it is done on board the vehicle, and samples can be immediately counted via gamma spectroscopy. Use of a vehicle can allow for monitoring on larger scales and would eliminate the need for cruise expenses. The disadvantage is the cost of the vehicle and instrument are high, and a skilled person is required to operate and set up the vehicle and sampler. With continued work to improve operational efficiency and simplify the user interface this method will be very useful and could successfully be applied for studies of chemical tracers and radiological monitoring.

metric Sensing Array. *J. Am. Chem. Soc*, Vol. 133, 7571-7576, U.S. Pat. No. 5,413,916, Miranda et al. 2010. Array-based Sensing with Nanoparticles: 'Chemical Noses' for Sensing Biomolecules and Cell Surfaces. *Current Opinion in Chemical Biology*, Vol. 14, No. 6, 728-736, Patent Application No. PCT/US2014/054,856, and U.S. Pat. No. 7,953,326.

TABLE 1

| Method | Collection Time (hr) | Process time (hr) | Absorbent Vol. (ml) | Column Bed Dimensions | Sample Vol. (L) | Pump Speed (ml min$^{-1}$) | Avg. Chem. Recovery % | Advantages | Disadvantages |
|---|---|---|---|---|---|---|---|---|---|
| 20 L cubitainer AMP-PAN | 0.1 | 8 | 5 | 1.0 × 10 cm | 20 | 40 | 93.5 | Consistently reliable High chemical recovery | Requires use of acid at sea Shipping cost |
| 20 L cubitainer KNiFC-PAN | 0.1 | 6 | 5 | 1.3 × 5 cm | 20 | 60 | 95 | No acid Consistently reliable High chemical recovery | Shipping cost 6 hr process time |
| 100 L High Flow KNiFC-PAN | 0.2 | 4 | 18 | 3.2 × 5.1 cm | 100 | 450-500 | 52-60% | No acid Shorter process time Larger volumes possible. | Poor chemical recovery possibly due to channelling of sample around absorbent |
| JetYak (KNiFC-PAN) | 1 | 0.1 | 14 | 2.1 × 4.7 cm | 12-25 | 200-350 | est. 95 | Autonomous sampling Immediately ready for counting Captures spatial variability | Cost of instrument Requires personnel to run equipment Longer collection time |
| Radband High Flow (KNiFC-PAN) | 2-5 | 0.2 | 5 | 90 u mesh bag 5 × 10 cm | estimated 14-36 | Towed | 75-90% | In situ collection Involves citizen scientists Minimal processing | Longer collection time Requires stable Cs analysis |
| Radband Passive (KNiFC-PAN) | 2-5 | 0.2 | 5 | 90 u mesh bag 5 × 10 cm | estimated 5-12 | Passive | 75-90% | In situ collection Involves citizen scientists Minimal processing | Longer collection time Requires stable Cs analysis Need to optimize to increase sample volume exposure |

Although specific features of the present invention are shown in some drawings and not in others, this is for convenience only, as each feature may be combined with any or all of the other features in accordance with the invention. While there have been shown, described, and pointed out fundamental novel features of the invention as applied to one or more preferred embodiments thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps that perform substantially the same function, in substantially the same way, to achieve the same results be within the scope of the invention. Substitutions of elements from one described embodiment to another are also fully intended and contemplated. It is also to be understood that the drawings are not necessarily drawn to scale, but that they are merely conceptual in nature.

This application incorporates the entire contents of the following applications, publications, and patents by reference: Ensing et al. 2002. Selective Sorbents for Solid-Phase Extraction Based on Molecularly Imprinted Polymers. *Sample Preparation Perspectives, LC GC Europe*, January 2-8, Freebersyser et al. 2010. Evaluation of a Commercial Colorimetric Dipstick Assay for the Detection of *Helicobacter hepaticus* Infections in Laboratory Mice. *J Am Assoc Lab Anim Sci*, Vol. 49, No. 3, 312-315, Carey et at. 2011. Rapid Identification of Bacteria with a Disposable Colori- It is the intention, therefore, to be limited only as indicated by the scope of the claims appended hereto. Other embodiments will occur to those skilled in the art and are within the following claims.

What is claimed is:

1. A personal portable environmental monitoring assembly, comprising:
    a carrier portable by an individual and suitable for immersion in an amorphous medium; and
    a sorbent module held by the carrier, capable of being exposed to amorphous medium of interest, and capable of capturing at least a first, target item and a second, reference item from the medium during a sampling period, the sorbent module having at least one sorbent material capable of capturing at least one of the first, target item and the second, reference item, wherein the carrier accompanies an individual entering the amorphous medium, wherein quantifying the reference item as captured by the sorbent material is suitable for estimating effective volume of the amorphous medium to which the sorbent module is exposed, and wherein the estimated effective volume is suitable for determining target item concentration in the amorphous medium; and
    at least one sensor module, held by the carrier and disposed in proximity to the sorbent module during the sampling period, to measure and store at least one environmental-related parameter that is (i) associated with the sampling period for the sorbent module and (ii) unaffected by items captured by the sorbent material.

2. The assembly of claim 1, wherein the sensor module is held by the carrier in proximity to the sorbent module at least during the sampling period.

3. The assembly of claim 1, wherein the carrier includes a wearable member.

4. The assembly of claim 3, wherein the assembly is suitable for immersion in water as the amorphous medium of interest.

5. The assembly of claim 1, wherein the carrier includes a towable container which houses both modules.

6. The assembly of claim 1, wherein the assembly is suitable for immersion in water as the amorphous medium of interest and the sensor module measures at least one of location, time, temperature, pH, radioactivity, and salinity of the water of interest during the sampling period.

7. The assembly of claim 1, wherein the target item and the reference item have similar chemical properties.

8. The assembly of claim 1, wherein a first sorbent material captures the target item and a second sorbent material captures the reference item, and wherein the first and second sorbent materials have first and second chemically selective properties, respectively, which differ from each other.

9. The assembly of claim 1, wherein the first target item is a radionuclide, and a single sorbent material captures both the target item and the reference item.

10. The assembly of claim 1, wherein the sorbent material functions even when immersed in seawater as the amorphous medium of interest.

11. The assembly of claim 1, wherein the sorbent material comprises KNiFC or AMP.

12. The assembly of claim 1, wherein the sorbent material comprises a granular structure, a resin, or a solid-state composition.

13. The assembly of claim 1 further including a second sorbent module held by the carrier, capable of being exposed to amorphous medium of interest, and capable of capturing at least the first, target item and the second, reference item from the medium during a sampling period, the sorbent module having at least one sorbent material capable of capturing at least one of the first, target item and the second, reference item, wherein the carrier accompanies the individual entering the amorphous medium, wherein quantifying the reference item as captured by the sorbent material is suitable for estimating effective volume of the amorphous medium to which the second sorbent module is exposed, and wherein the estimated effective volume is suitable for determining target item concentration in the amorphous medium.

14. A method for measuring at least one property of water, comprising:

selecting an assembly having a carrier portable by an individual and a sorbent module held by the carrier, capable of being exposed to water of interest, and capable of capturing at least a first, target item and a second, reference item in the water during a sampling period, quantification of the reference item as captured by the sorbent material being suitable for estimating effective volume of the water to which the sorbent module is exposed, and the estimated effective volume being suitable for determining target item concentration in the water, the sorbent module having at least one sorbent material capable of capturing at least one of the first, target item and the second, reference item;

exposing the sorbent module to the water of interest during the sampling period while measuring at least one environmental-related parameter that is (i) associated with the sampling period for the sorbent module and (ii) unaffected by items captured by the sorbent material; and determining the concentration of the target item in the water of interest by comparing it to the amount of reference item captured during the sampling period.

15. The method of claim 14, wherein the carrier includes a wearable member to facilitate portability of the carrier by the individual, and exposing of the sorbent module to the water of interest occurs while the carrier is worn by the individual.

16. The method of claim 14, wherein a first sorbent material captures the target item and a second sorbent material captures the reference item, and wherein the first and second sorbent materials have first and second chemically selective properties, respectively, which differ from each other.

17. The method of claim 14, wherein the first target item is a radionuclide, and a single sorbent material captures both the target item and the reference item.

18. The method of claim 17, wherein the radionuclide is selected from cesium, plutonium, strontium, iodine, and cobalt.

19. The method of claim 14, wherein determining the concentration of the target item includes referring to a known concentration of the reference item in the water.

20. The method of claim 14, wherein the selected assembly further includes at least one sensor module, held by the carrier and disposed in proximity to the sorbent module during the sampling period, to measure and store at least one environmental-related parameter that is associated with the sampling period for the sorbent module yet is independent of items captured by the sorbent material, and measuring the at least one environmental-related parameter utilizes the sensor module to measure and store the parameter.

* * * * *